United States Patent

Nielsen

[11] 4,040,722
[45] Aug. 9, 1977

[54] LIGHT BEAM CONTROLLER

[75] Inventor: Asger Torben Nielsen, Fullerton, Calif.

[73] Assignee: Addressograph Multigraph Corporation, Cleveland, Ohio

[21] Appl. No.: 671,706

[22] Filed: Mar. 29, 1976

[51] Int. Cl.² .............................................. G02F 1/32
[52] U.S. Cl. ................................................ 350/161 W
[58] Field of Search .................................. 350/160, 161

[56] References Cited

U.S. PATENT DOCUMENTS 3,462,212  8/1969  Denton ................................. 350/161
3,931,595  1/1976  Isaacs et al. ........................... 350/161

Primary Examiner—William L. Sikes
Attorney, Agent, or Firm—Harry M. Fleck, Jr.

[57] ABSTRACT

An acousto optical diffraction cell, capable of passing polychromatic radiation and useful in a high speed, high intensity character generator. A monoclinic prism behaves like a parallel plate of glass when deenergized, and diffracts light under Bragg angle conditions over a useful spectral range when energized, thus ensuring a high I1/I0 ratio. The cell can be used as a very fast linear scan device, or it can be used as a multiple light beam modulator.

2 Claims, 3 Drawing Figures

LIGHT BEAM CONTROLLER

BACKGROUND OF THE INVENTION

This invention is related to acousto optical diffraction cells, which have been used for some time as light beam scanning and modulating devices in systems utilizing monochromatic light sources such as lasers.

Diffraction cells of various types and with a wide range of performance characteristics are manufactured by FJW Industries (Model M-40R Light Modulator, Model D-70R laser Deflector and others) and by Isomet Corporation (Series LD-401 and others).

A common limitation for all models is the inability to properly control polychromatic light.

Diffraction cells are usually operated in such a way, that the Bragg condition is satisfied. This requires, that $$\sin B = \frac{w}{2nW},$$

where the Bragg angle, $B$ is the angle between the ultrasonic wavefront and the direction of light inside the crystal, $n$ is the refractive index of the crystal at a given value of $w$, which is the wavelength of light in vacuum, and $W$ is the wavelength of the ultrasonic wave inside the crystal.

Not only will light of different wavelengths be deflected through different angles for the same value of $W$ but the efficiency of the cell, defined as the percentage of light, that can be removed from the zero order beam, decreases as the input angle deviates from the Bragg angle.

Temperature changes in the diffraction cell material have an effect on ultrasonic wavelength and therefor on deflection angle. U.S. Pat. No. 3,462,212 illustrates an attempt to overcome some of these problems. It should be realized however, that the ability to deflect a polychromatic beam, such that color integrity is preserved in the exit beam, is possible only for one particular deflection angle, and even in that case only if the index of refraction of the cell material is a linear function of the wavelength of light.

It is therefor an object of this invention to provide a light beam scanning device, which will afford true linear scanning of a polychromatic light beam.

It is an other object of the invention to provide an acousto optical diffraction device, that will maintain color integrety of the scanning light beam.

It is a further object of the invention to provide an acousto optical diffraction device, useful for modulation of polychromatic light.

It is a further object of the invention to provide a light beam scanning device, where the light beam direction is independent of device temperature.

It is additionally an object of the invention to provide a polychromatic light modulator, that can be used with a high intensity light beam.

It is also an object of the invention to provide a linear scan device, that can be operated in either the positive or the negative mode.

It is a further object of the invention to provide a lightbeam scan device, where the output beam direction is independent of the refractive index of the device material.

It is an additional object of the invention to provide a polychromatic scan device, that will operate at high scanning rates.

GENERAL DESCRIPTION

Figure 1:
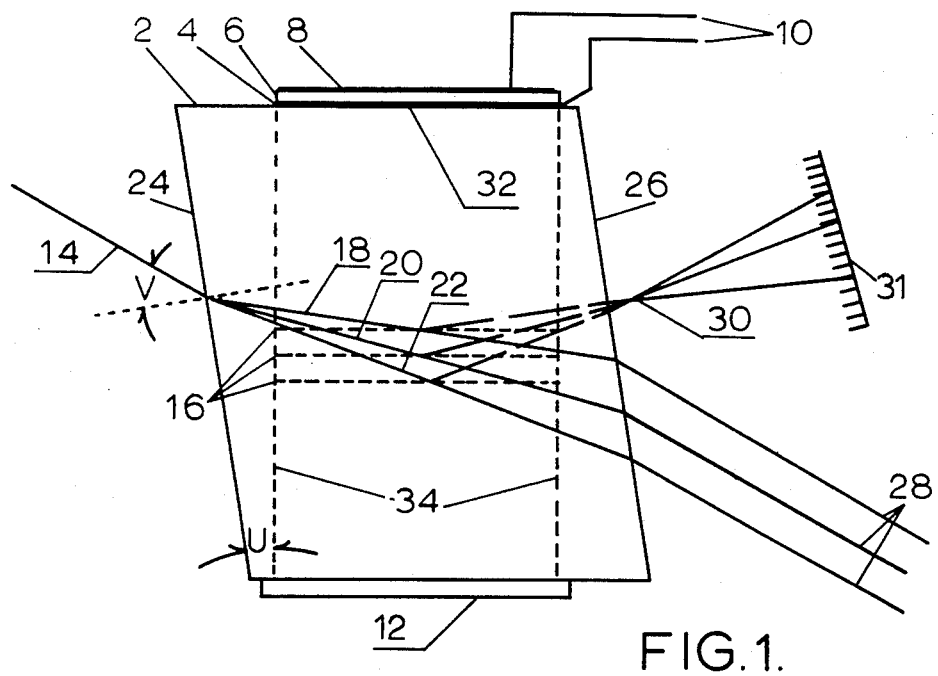
FIG. 1 is a cross section of the diffraction cell made according to this invention.

FIG. 1 shows in schematic form the cross section of an acousto optical diffraction cell made according to the invention.

Body 2 is a monoclinic prism made from a material that has high ultrasonic velocity, wide spectral transmission range, closer to linear relationship between index of refraction and wavelength of light over a useable spectral range and is available in large sizes at low cost. A material such as $Al_2O_3$ satisfies most of these requirements. An electrode 4 is bonded to one end of the prism. A piezoelectric wafer 6 is attached to electrode 4 and a second electrode 8 is bonded to wafer 6. Two wires 10 are connected to the electrodes. At the other end of the prism an acoustic absorber 12 is attached. A sinusoidal signal of constant frequency (several hundred MHz) can be connected to wires 10 from an external source (not shown). The entire left side face 24 of prism 2 is exposed to radiation in the form of a collimated light beam covering a certain spectral range. A single ray 14 indicates the direction of the radiation, which makes an angle V with the normal to face 24.

After the radiation enters body 2, it is refracted according to Snell's law. This is represented by beams 18, 20 and 22.

As long as the high frequency sinusoidal signal is not applied to transducer 6, rays 18, 20 and 22 will continue through prism 2, until they at the right side face 26 again enter the air, where they once more are refracted. The direction indicated by 28 is the same as that of the incoming beam 14, because prism face 24 is parallel to prism face 26. As a result, the exit beam has the same chromatic quality as the entrance beam.

When transducer 6 is energized by a sinusoidal signal applied to wires 10, a compression wave is propagated through the prism in a direction perpendicular to prism face 32 and generally found within boundaries 34. At the opposite end of prism 2 the compression wave is converted to heat in absorber 12, and therefor practically no ultrasonic energy is reflected back into the prism.

Where the incoming light beams, 18, 20 and 22 meet the compression wavefronts 16, diffraction takes place.

In order to cause the highest percentage of the energy in beams 18, 20 and 22 to be removed from exit beams 28, it is necessary, that each of the three beams meet the wavefronts 16 at the Bragg angle. This requires in each case that $$\sin B = \frac{w}{2nW}$$

where the Bragg angle $B$, is the angle inside the prism between the light beam and the ultrasonic wavefront, $w$ is the wavelength of light $i$ vacuum, $n$ is the refractive index of the prism material and $W$ is the wavelength of the compression wave. If the relationship between $n$ and $w$ were linear, it would be possible to calculate and arrange angles U and V on FIG. 1 in such a way, that light of all frequencies after refraction would meet the ultrasonic wavefronts under the exact Bragg angle. In any transparent material however, the rate of change of $n$ increases towards the shorter wavelengths of light. It is therefor possible only to reach a compromise in Bragg angle error for a given material over a given spectral range.

For $Al_2O_3$ used with light containing the mercury vapor lines $g$, $h$ and $m$ at 435.8nm, 404.7nm and 365nm, $U=14.62°$ and $V=27.95°$. In this case the Bragg angle error is less than 0.6%, and the resultant efficiency in removing light from the desired beam is better than 99%.

In certain cases optical prisms made from a material with a different index of refraction the diffraction cell can be utilized to reduce this error to even smaller values. Two such prisms would be used, one mounted on each side of the diffraction cell to preserve the alignment of input beam 14 and output beams 28. This method is wellknown among designers of achromatic prisms.

Figure 2:
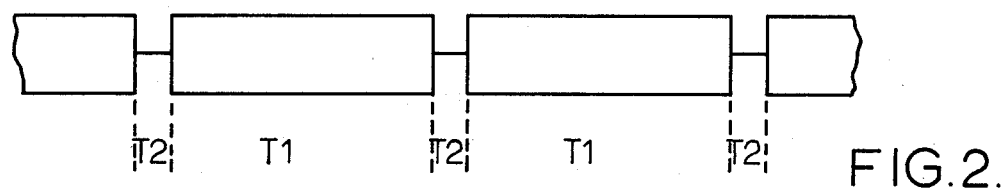
FIG. 2 is the modulation envelope of the ultrasonic sine wave signal, that is used to create a linear scan in the cell shown in FIG. 1.

The modulation envelope of a high frequency sinusoidal signal is shown on FIG. 2. It is on for the time interval $T_1$, which is slightly longer than the time it takes the ultrasonic wavefront to travel through the diffraction cell in FIG. 1. When this signal is connected to the transducer wires 10 on FIG. 1, there will be a very short time, where the entire space between electrode 4 and absorber 12 will be filled with the compression wave. As a result, all the light energy, that enters prism face 24 will be diffracted in the general direction of beam 30 into light absorber 31.

During time interval $T_2$ on FIG. 2 the ultrasound signal is turned off and diffraction does not take place. Instead a narrow light beam leaves the prism in the direction of beam 28. This light beam emerges first from prism face 26 at the end, where transducer 6 is attached and travels the height of the prism, until the next signal of duration $T_1$ fills the prism. A succession of narrow light beams is therefor caused to sweep the aperture of the diffraction cell.

A diffraction cell made from $Al_2O_3$ with a height of 1 cm would allow $T_1$ to be 1 microsecond. A value of $T_2=50$ nanoseconds would result in a light beam, that would be 0.5mm wide. This yields a scan rate of 1 MHz, which is considerably faster than can be obtained from deflection cells that are presently available.

Since the desired light beam passes through the cell as if it were a parallel glass plate, temperature variations in the cell will have a very insignificant effect on both direction and chromatic characteristics of the output beam.

The light beam that enters prism face 24 can be modulated by means of an electro optic shutter such as model 403 B, manufactured by Isomet Corporation. (Not shown on FIG. 1) With additional scanning devices such as galvanometer driven mirrors or rotating mirrors and other optical components, the diffraction cell made according to these specifications can advantageously be utilized in high speed alphanumeric computer output equipment.

In a system, that utilizes an acousto optical device operated in an on-off mode, it will be very simple to arrange the controlling circuits such that light and dark areas can be interchanged. In a printing device this capability can be used to generate light characters on a dark background or vice versa.

Figure 3:
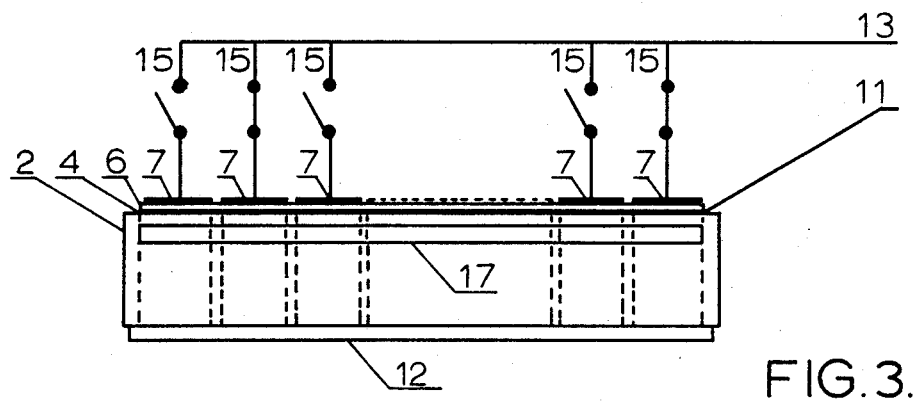
FIG. 3 is a front view of a different embodiment of the diffraction cell.

A second embodiment of the invention is shown on FIG. 3. The cell body 2 has the same cross sectional form as on FIG. 1. Electrode 4 and piezoelectric transducer 6 are also arranged the same way. The second electrode labeled 7 consists of a number of sections separated by narrow gaps. Each section is connected through a switch 15 to wire 13, while electrode 4 is connected to wire 11. A continuous electrical sinewave from an external source can be connected to each of the switches through wire 13, with wire 11 serving as the common return to the signal source.

The ultrasonic sinewave signal will cause compression waves to be generated by the transducer only in the areas immediately below those sections of electrodes 7, that are connected to the signal source through closed switches. In those areas the compression wave travels through the prism towards absorber 12.

A thin ribbon of collimated polychromatic light, seen in cross section as 17 on FIG. 3, enters the prism in a direction perpendicular to the paper. In the areas where no compression wave is being introduced, the light will emerge from the opposing face of the prism with its color composition intact and in the same direction as that of the input beam.

At the locations where the light meets the ultrasound, diffraction takes place and the light leaves the prism in the direction 30 as shown in FIG. 1. By selectively turning the switches 15 on and off as functions of time, the exit light beam can be used to generate many different combinations of light and dark areas, which can be utilized in high speed printing equipment and other pattern generators.

Because the incoming light energy is distributed over the entire area 17 on FIG. 3, rather than being focused to a small spot inside the diffraction cell, as in conventional acousto optical modulators, the possibility for damage to the cell material is greatly reduced.

While there has been described and illustrated specific embodiments of the invention, it will be obvious to those skilled in the art, that various changes and mofifications may be made therein, without departing from the spirit and scope of the invention, which is defined by the attached claims.

I claim:
1. An acousto optical diffraction cell comprising:
   a. a piezoelectric transducer, including a pair of electrodes bonded to opposite sides of said transducer;
   b. a monoclinic prism bonded to said transducer in such a way, that an ultrasonic wavefront generated by said transducer propagates in a direction that makes the same acute angle with both surfaces where light enters and exits;
   c. the value of said acute angle is chosen such that incoming light of different wavelengths meet said ultrasonic wavefronts at angles that are substantially equal to the Bragg angle.
2. An acousto optical diffraction cell as in claim 1, where:
   a. at least one of said electrodes is divided into a number of separate sections;
   b. said separate sections being aligned in a row the direction of which is perpendicular to the direction of the incoming light beam and to the direction of propagation of said ultrasonic wavefront.

* * * * *